(12) United States Patent
Fujimoto

(10) Patent No.: US 12,084,072 B2
(45) Date of Patent: Sep. 10, 2024

(54) ARITHMETIC OPERATION DEVICE FOR AUTOMOBILES

(71) Applicant: Mazda Motor Corporation, Hiroshima (JP)

(72) Inventor: Hideomi Fujimoto, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 400 days.

(21) Appl. No.: 17/598,468

(22) PCT Filed: Feb. 27, 2020

(86) PCT No.: PCT/JP2020/008070
§ 371 (c)(1),
(2) Date: Sep. 27, 2021

(87) PCT Pub. No.: WO2020/202936
PCT Pub. Date: Aug. 10, 2020

(65) Prior Publication Data
US 2022/0185304 A1 Jun. 16, 2022

(30) Foreign Application Priority Data
Mar. 29, 2019 (JP) ................. 2019-066776

(51) Int. Cl.
*B60W 50/06* (2006.01)
*B60W 50/00* (2006.01)
(Continued)

(52) U.S. Cl.
CPC ............ *B60W 50/06* (2013.01); *G06T 1/20* (2013.01); *G06T 1/60* (2013.01); *B60W 2050/0031* (2013.01); *B60W 2420/403* (2013.01)

(58) Field of Classification Search
None
See application file for complete search history.

(56) References Cited

U.S. PATENT DOCUMENTS 10,705,525 B2* 7/2020 Smolyanskiy ......... G06N 3/084
11,550,334 B2* 1/2023 Zheng ................... G06N 3/006
(Continued)

FOREIGN PATENT DOCUMENTS

CN 106080744 A 11/2016
JP 2017-61278 A 3/2017

OTHER PUBLICATIONS

Liu et al., "Computer Architectures for Autonomous Driving", Computer, vol. 50 No. 8, Aug. 2017, pp. 18-25. (Year: 2017).*
(Continued)

*Primary Examiner* — Todd Melton
(74) *Attorney, Agent, or Firm* — XSENSUS LLP

(57) ABSTRACT

An arithmetic operation device for automobiles includes a first arithmetic operation section (301) having a common configuration for a plurality of vehicle models and a second arithmetic operation section (302) having a configuration in accordance with a vehicle model of an automobile. The first arithmetic operation section (301) includes an image processor (311) configured to perform predetermined image processing on an output of a camera installed in the automobile, and a memory (320) configured to store a generated image signal. The second arithmetic operation section (302) includes a processor (340) configured to execute an application in accordance with the vehicle model using the image signal stored in the memory (320) and to transmit an execution result to the first arithmetic operation section (301).

10 Claims, 6 Drawing Sheets

(51) Int. Cl.
    *G06T 1/20*       (2006.01)
    *G06T 1/60*       (2006.01)

(56) References Cited

U.S. PATENT DOCUMENTS

2016/0313738 A1    10/2016  Kindo et al.
2018/0032082 A1    2/2018  Shalev-Shwartz et al.
2018/0246515 A1    8/2018  Iwama et al.

OTHER PUBLICATIONS

Kato et al., "Autoware on Board: Enabling Autonomous Vehicles with Embedded Systems", ACM/IEEE 9th International Conference on Cyber-Physical Systems (ICCPS), Apr. 2018, pp. 287-296. (Year: 2018).*
International Search Report and Written Opinion mailed on May 26, 2020, received for PCT Application PCT/JP2020/008070, Filed on Feb. 27, 2020, 8 pages including English Translation.

* cited by examiner

FIG.2A VEHICLE MODEL A
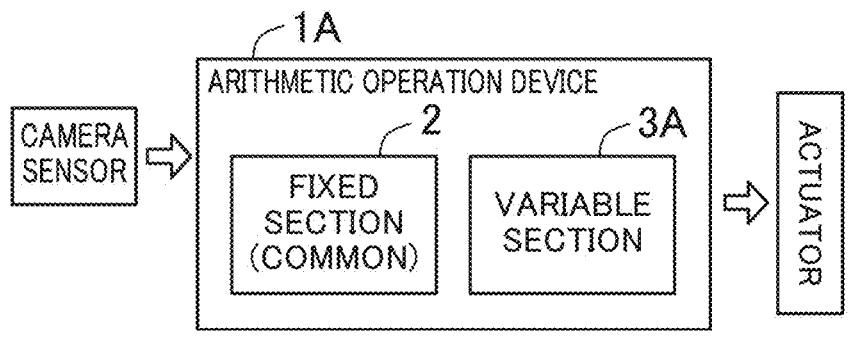
FIG.2B VEHICLE MODEL B
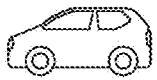
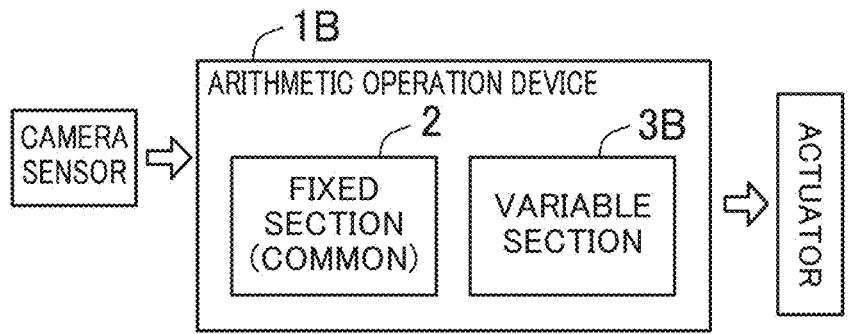
FIG.2C VEHICLE MODEL C
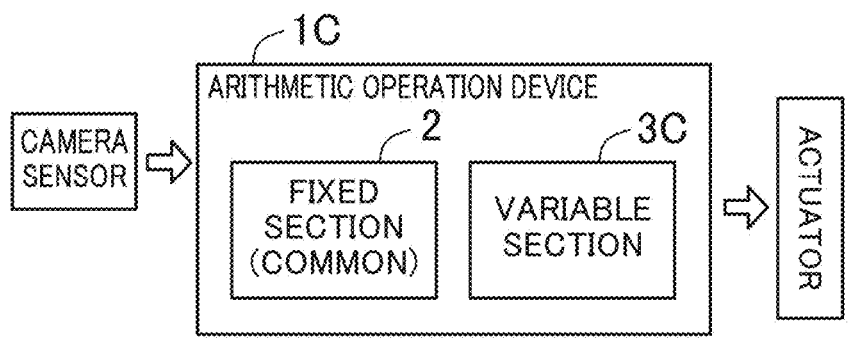

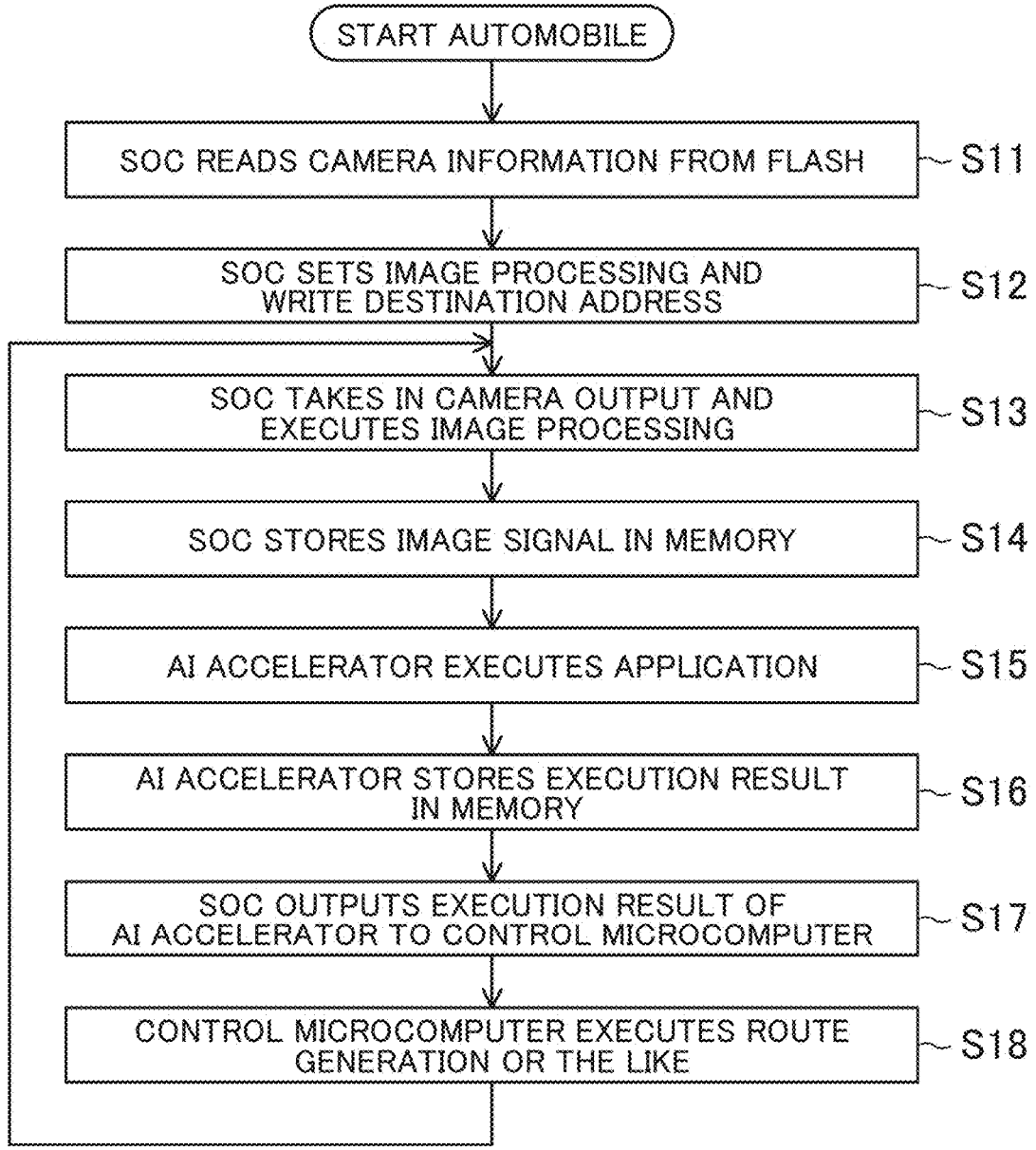

ARITHMETIC OPERATION DEVICE FOR AUTOMOBILES

CROSS-REFERENCE TO RELATED APPLICATIONS

The present application is based on PCT filing PCT/JP2020/008070, filed Feb. 27, 2020, which claims priority to JP 2019-066776, filed Mar. 29, 2019, the entire contents of each are incorporated herein by reference.

TECHNICAL FIELD

The technology disclosed herein relates to an arithmetic operation device for automobiles used for, for example, automatic driving of an automobile.

BACKGROUND ART

Patent Document 1 discloses a system that controls a plurality of in-vehicle devices, such as an engine, a steering, or the like, mounted on an automobile. In order to control the plurality of in-vehicle devices, this control system has a hierarchized configuration of an integrated controller, a domain controller, and a device controller.

CITATION LIST

Patent Document

PATENT DOCUMENT 1: Japanese Unexamined Patent Publication No. 2017-061278

SUMMARY OF THE INVENTION

Technical Problem

In order to realize highly accurate automatic driving, a motion of an automobile has to be controlled in accordance with comprehensive judgements, based on not only an environment around the automobile but also various information of a state of a driver, a state of the automobile, or the like. Therefore, it is necessary to process a huge amount of data from a camera, a sensor, a network outside the automobile, or the like at high speed, determine an optimal motion of the automobile at each moment, and operate each actuator, and it is also necessary to construct an arithmetic operation device used for this purpose.

Demands for performance or functions of such an arithmetic operation device vary in accordance with a vehicle model or a grade of an automobile. For example, depending on the number of cameras installed in the automobile and arrangement positions thereof, processing, such as image processing or the like, performed on camera outputs differs. Therefore, it is necessary to configure an arithmetic operation device for each model or each grade of an automobile. However, if different arithmetic operation devices are configured as independent devices from each other, development costs and production costs are increased. Moreover, in a case where a specification change or a version upgrade is needed for a specific component in the arithmetic operation device, the entire arithmetic operation device has to be replaced.

In view of the foregoing, the technology disclosed herein has been devised, and it is therefore an object of the present disclosure to suppress increase of costs and allow easy execution of a specification change or aversion upgrade for an arithmetic operation device for automobiles.

Solution to the Problem

Specifically, the technology disclosed herein is directed to an arithmetic operation device for automobiles mounted on an automobile and configured to execute an arithmetic operation for controlling traveling of the automobile, the arithmetic operation device includes a first arithmetic operation section having a common configuration for a plurality of vehicle models including a vehicle model of the automobile, and a second arithmetic operation section being capable of transmitting and receiving data to and from the first arithmetic operation section and having a configuration in accordance with the vehicle model of the automobile, the first arithmetic operation section includes an image processor configured to perform predetermined image processing on an output of a camera installed in the automobile, and a memory configured to store an image signal generated by the image processor, and the second arithmetic operation section includes a processor configured to execute an application in accordance with the vehicle model of the automobile using the image signal stored in the memory and to transmit an execution result to the first arithmetic operation section.

According to this configuration, the arithmetic operation device for automobiles includes the first arithmetic operation section having a common configuration for a plurality of automobile modes and the second arithmetic operation section having a configuration in accordance with the vehicle model of the automobile. The first arithmetic operation section includes the image processor configured to perform predetermined image processing on an output of a camera installed in the automobile and the memory configured to store an image signal generated by the image processor, and the second arithmetic operation section includes the processor configured to execute an application in accordance with the vehicle model of the automobile using the image signal stored in the memory and to transmit an execution result to the first arithmetic operation section. Thus, the first arithmetic operation section is common for the plurality of vehicle models, and therefore, development costs or production costs can be reduced. On the other hand, the second arithmetic operation section has a configuration in accordance with the vehicle model. In performing a specification change or a version upgrade of the processor, it is not necessary to replace the entire arithmetic operation device, and only the second arithmetic operation section may be replaced.

In the above-described arithmetic operation device for automobiles, the second arithmetic operation section may further include a second memory configured to store camera information in accordance with the vehicle model of the automobile, and the first arithmetic operation section may be configured to read camera information from the second memory and set processing contents of image processing in the image processor in accordance with the camera information.

According to this configuration, the second arithmetic operation section includes the second memory configured to store camera information in accordance with the vehicle model of the automobile, and the first arithmetic operation section reads camera information from the second memory and sets processing contents of image processing in accordance with the camera information. Thus, the first arithmetic operation section can execute image processing in accordance with the vehicle model on a camera output while the first arithmetic operation section has a common configuration for the plurality of vehicle models.

In the above-described arithmetic operation device for automobiles, the first processing section may be mounted on a first substrate, and the second processing section may be mounted on a second substrate that is different from the first substrate.

According to this configuration, the first arithmetic operation section and the second arithmetic operation section are mounted on separate substrates, and therefore, influences of heat generation or the like of the first arithmetic operation section and the second arithmetic operation section on each other can be avoided.

Furthermore, the first substrate and the second substrate may be coupled to different power source systems.

Thus, the first arithmetic operation section and the second arithmetic operation section can further avoid influences of heat generation, power consumption, or the like of the first arithmetic operation section and the second arithmetic operation section on each other.

Moreover, in the above-described arithmetic operation device for automobiles, the processor may be configured to execute an arithmetic operation using a learnt model generated by deep learning.

In this configuration, there is a probability that, in a so-called AI processing unit that executes arithmetic processing using a learnt model generated by deep learning, an update is frequently performed. The AI processing unit is provided in the second arithmetic operation section. Therefore, in performing a specification change or a version upgrade of the AI processing unit, it is not necessary to replace the entire arithmetic operation device, and only the second arithmetic operation section may be replaced.

Furthermore, in the above-described arithmetic operation device for automobiles, the first arithmetic operation section may be configured to generate a route of the automobile, based on an execution result of an application executed by the processor, and to execute route generation by a rule base function when the processor has failed.

Thus, even when the AI processing unit has failed, the arithmetic operation device for automobiles can hold basic functions, such as route generation or the like.

Advantages of the Invention

According to the present disclosure, for an arithmetic operation device for automobiles, increase of costs can be suppressed and a specification change or a version upgrade can be easily executed.

BRIEF DESCRIPTION OF THE DRAWINGS

FIG. 2A to FIG. 2C are conceptual diagrams illustrating features of the present disclosure.

FIG. 6 is a flowchart illustrating a flow of processing in the configuration example of FIG. 3.

DESCRIPTION OF EMBODIMENTS

Figure 1:
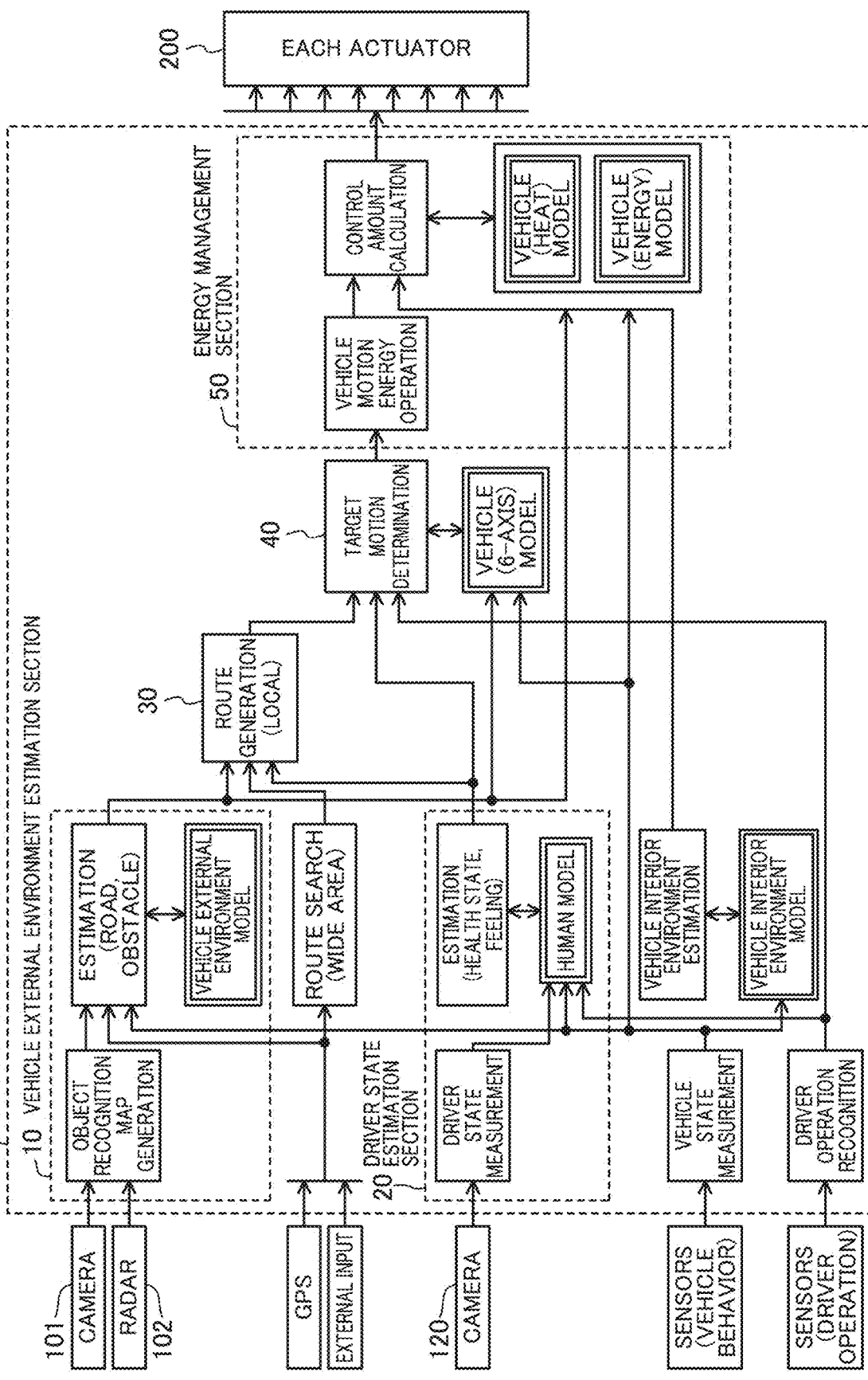
FIG. 1 is a block diagram illustrating a functional configuration example of an arithmetic operation device for automobiles.

FIG. 1 is a block diagram illustrating a functional configuration example of an arithmetic operation device for automobiles. The configuration of FIG. 1 includes an information processing unit 1 mounted on an automobile. The information processing unit 1 is an example of an arithmetic operation device for automobiles according to the present disclosure. The information processing unit 1 receives various types of signals or data related to the automobile as inputs, executes an arithmetic operation, based on the signals or data, for example, using a learnt model generated by deep learning, and determines a target motion of the automobile. Then, the information processing unit 1 generates an operation signal of each actuator 200 of the automobile, based on the determined target motion.

The information processing unit 1 includes a vehicle external environment estimation section 10, a driver state estimation section 20, a route generation section 30, a target motion determination section 40, and an energy management section 50. The vehicle external environment estimation section 10 receives an output of a camera 101, a radar 102, or the like mounted on the automobile to estimate a vehicle external environment. The driver state estimation section 20 estimates a health state, a feeling, or a physical behavior of a driver from an image captured by a camera 120 installed in a vehicle cabin. The route generation section 30 generates a traveling route of the automobile using an output of the vehicle external environment estimation section 10. The target motion determination section 40 determines a target motion for the traveling route generated by the route generation section 30. The energy management section 50 calculates a driving force, a braking force, and a steering angle used for realizing the target motion determined by the target motion determination section 40.

FIG. 2A to FIG. 2C are conceptual diagrams illustrating features of this embodiment. In this embodiment, the arithmetic operation device for automobiles is configured so as to be divided into a fixed section and a variable section. The fixed section has a common configuration for a plurality of vehicle models. On the other hand, the variable section has a configuration in accordance with a vehicle model (including a grade). That is, as illustrated in FIG. 2A to FIG. 2C, a vehicle model A includes an arithmetic operation device 1A, a vehicle model B includes an arithmetic operation device 1B, and a vehicle model C includes an arithmetic operation device 1C. Each of the arithmetic operation devices 1A, 1B, and 1C includes a fixed section 2 having a common configuration. On the other hand, as for the variable section, the arithmetic operation device 1A includes a variable section 3A, the arithmetic operation device 1B includes a variable section 3B, the arithmetic operation device 1C includes a variable section 3C, and each of the variable sections 3A, 3B and 3C has a configuration in accordance with the corresponding vehicle model.

The above-described configuration allows reduction in development costs or production costs in the arithmetic operation device for automobiles because the fixed section is common for any vehicle model. On the other hand, the configuration of the variable section can be changed depending on the vehicle model, and therefore, a specification change or a version upgrade can be easily executed. That is, a component that is likely to be frequently updated is preferably provided in the variable section. For example, a so-called AI processing unit that executes arithmetic processing using a learnt model generated by deep learning is preferably provided in the variable section. Thus, in performing a specification change or a version upgrade of the AI processing unit, it is not necessary to replace the entire arithmetic operation device, and only the variable section may be replaced. Note that the fixed section corresponds to a first arithmetic operation section and the variable section corresponds to a second arithmetic operation section.

Figure 3:
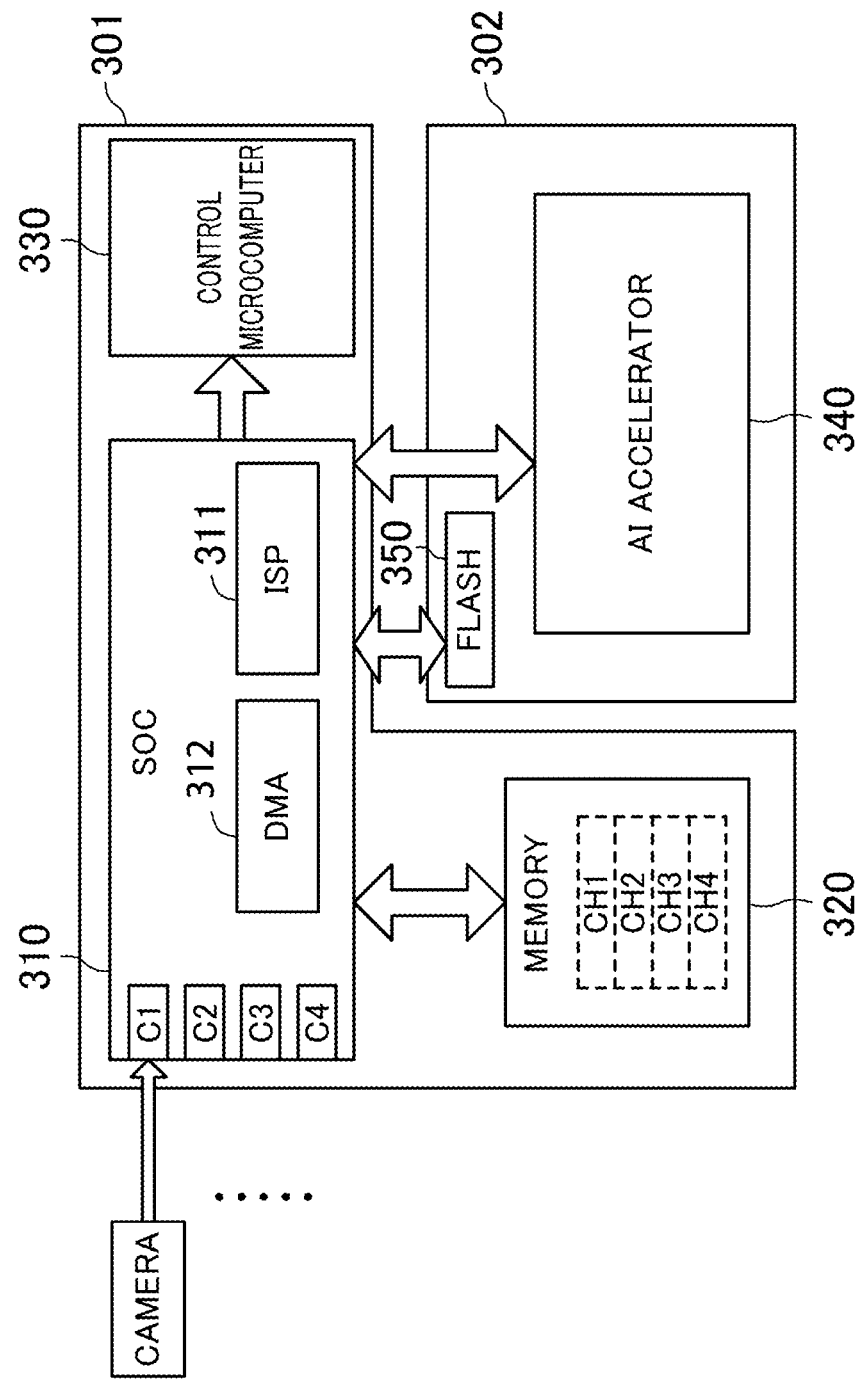
FIG. 3 is a diagram illustrating a specific chip configuration example of an arithmetic operation device for automobiles according to an embodiment.

FIG. 3 is a diagram illustrating a specific chip configuration example of an arithmetic operation device for automobiles in this embodiment. In FIG. 3, the arithmetic operation device for automobiles is configured so as to be divided into a main substrate 301 and a sub-substrate 302. A system on chip (SOC) 310, a memory 320, and a control microcomputer 330 are mounted on the main substrate 301. An AI accelerator 340 and a flash memory 350 are mounted on the sub substrate 302. The main substrate 301 on which the SOC 310, the memory 320, and the control microcomputer 330 are mounted corresponds to the fixing section, that is, the first arithmetic operation section. That is, the main substrate 301 has a common configuration for a plurality of vehicle models. On the other hand, the sub substrate 302 on which the AI accelerator 340 and the flash memory 350 are mounted corresponds to the variable section, that is, the second arithmetic operation section. That is, the sub substrate 302 has a configuration in accordance with the vehicle model.

On the main substrate 301, the SOC 310 includes an input port that receives an output of a camera installed in the automobile as an input. The number of input ports preferably corresponds to a maximum number of cameras that can be assumed for a plurality of vehicle models commonly using the main substrate 301. In the configuration of FIG. 3, the SOC 310 includes four input ports C1 to C4, and therefore, outputs of four cameras can be input to the SOC 310 at maximum. The SOC 310 includes an image processor (image signal processor: ISP) 311 and a memory access (direct memory access: DMA) 312. The image processor 311 performs predetermined image processing on camera outputs that have been input to the input ports C1 to C4. The direct memory access 312 executes an access to the memory 320. For example, an image signal generated by the image processor 311 is stored in the memory 320 via the memory access 312.

On the sub substrate 302, the AI accelerator 340 executes arithmetic processing using a learnt model generated by deep learning. For example, the AI accelerator 340 executes an application in accordance with the vehicle model of the automobile using the image signal stored in the memory 320 and stores an execution result of the application in the memory 320. The flash memory 350 stores camera information in accordance with the vehicle model of the automobile. The SOC 310 reads the camera information from the flash memory 350 and sets, for example, processing contents of image processing in the image processor 311 in accordance with the read camera information.

The AI accelerator 340 executes data input and output to and from the main substrate 301 via a different input and output port from an input and output port for the flash memory 350. Herein, the AI accelerator 340 transfers data from and to the SOC 310, for example, via PCI Express.

On the main substrate 301, the control microcomputer 330 reads, for example, an execution result of the application executed by the AI accelerator 340 from the memory 320 and generates a traveling route of the automobile. Then, the control microcomputer 330 determines a target motion of the automobile for the generated traveling route and calculates a driving force, a braking force, and a steering angle used for realizing the determined target motion.

Figure 4B:
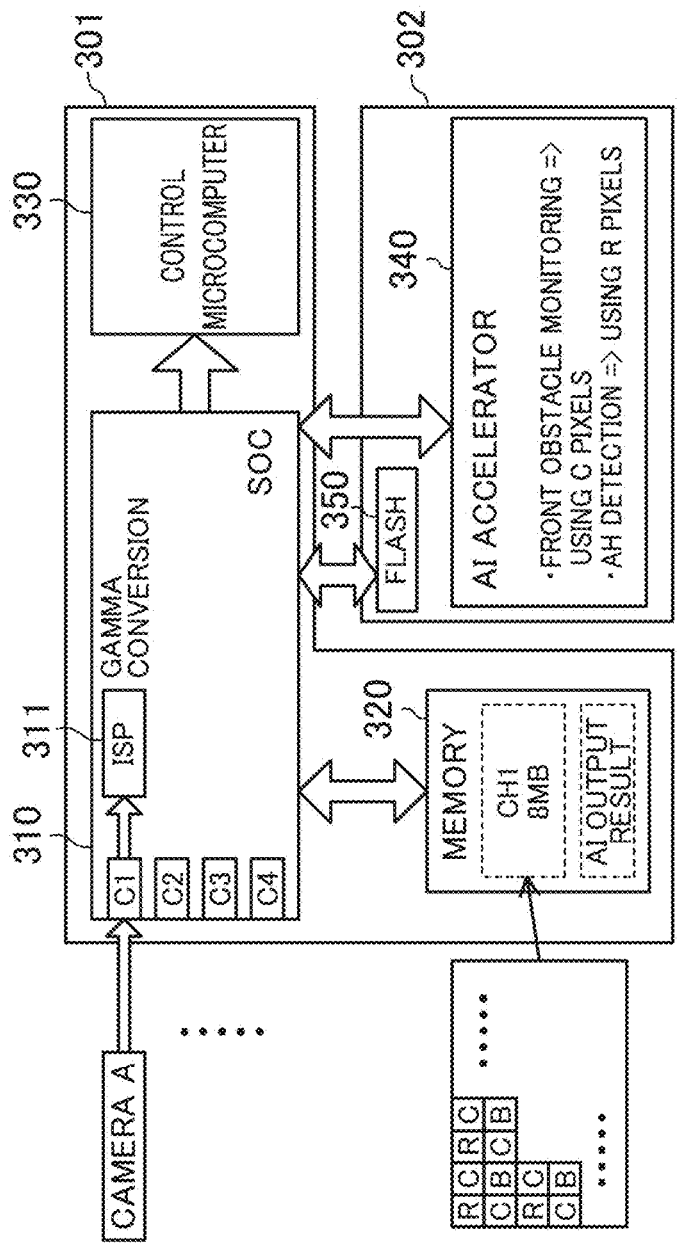
FIG. 4A and FIG. 4B are diagrams illustrating a case where the configuration of FIG. 3 is applied to a low-grade vehicle model.
Figure 4A:
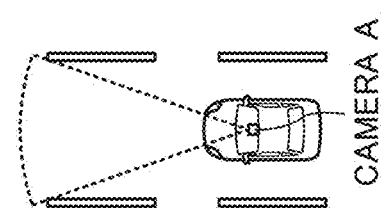

FIG. 4A and FIG. 4B are diagrams illustrating a case where the configuration of FIG. 3 is applied to a low-grade vehicle model. As illustrated in FIG. 4A, in this vehicle model, a camera A that captures images of front of the automobile is installed. The camera A outputs data of 1 pixel 12 bits in a RCCB format. As used herein, RCCB denotes colors, that is, R denotes red pixel, B denotes a blue pixel, and C denotes a clear pixel. The clear pixel cannot pass through a wavelength band-pass filter used for extracting colors of normal light, that is, RGB, and is pixel data that exhibits high sensitivity even with low illuminance. In this case, in the flash memory 350, as information of image processing performed on an output of the camera A, processing of converting the data to data of 8 bits through gamma conversion is set. As illustrated in FIG. 4B, the SOC 310 reads camera information from the flash memory 350 and sets processing of converting the camera information to data of 8 bits through gamma conversion as image processing. Then, the image processor 311 executes image processing on the camera output that has been input to the input port C1 and stores an image signal of a result of execution in the memory 320 (CH1 data).

In the AI accelerator 340, as applications of this vehicle model, front obstacle monitoring and automatic high beam (AH) detection are set. Front obstacle monitoring is executed using C pixels of the CH1 data and AH detection is executed using R pixels of the CH1 data. The AI accelerator 340 stores execution results of the applications in the memory 320. Information, that is, for example, whether an obstacle is rapidly approaching and front emergency braking is needed, or the like, is stored in the memory 320. The execution results of the applications executed by the AI accelerator 340 are used for processing thereafter, that is, for example, route generation executed by the control microcomputer 330.

Figure 5B:
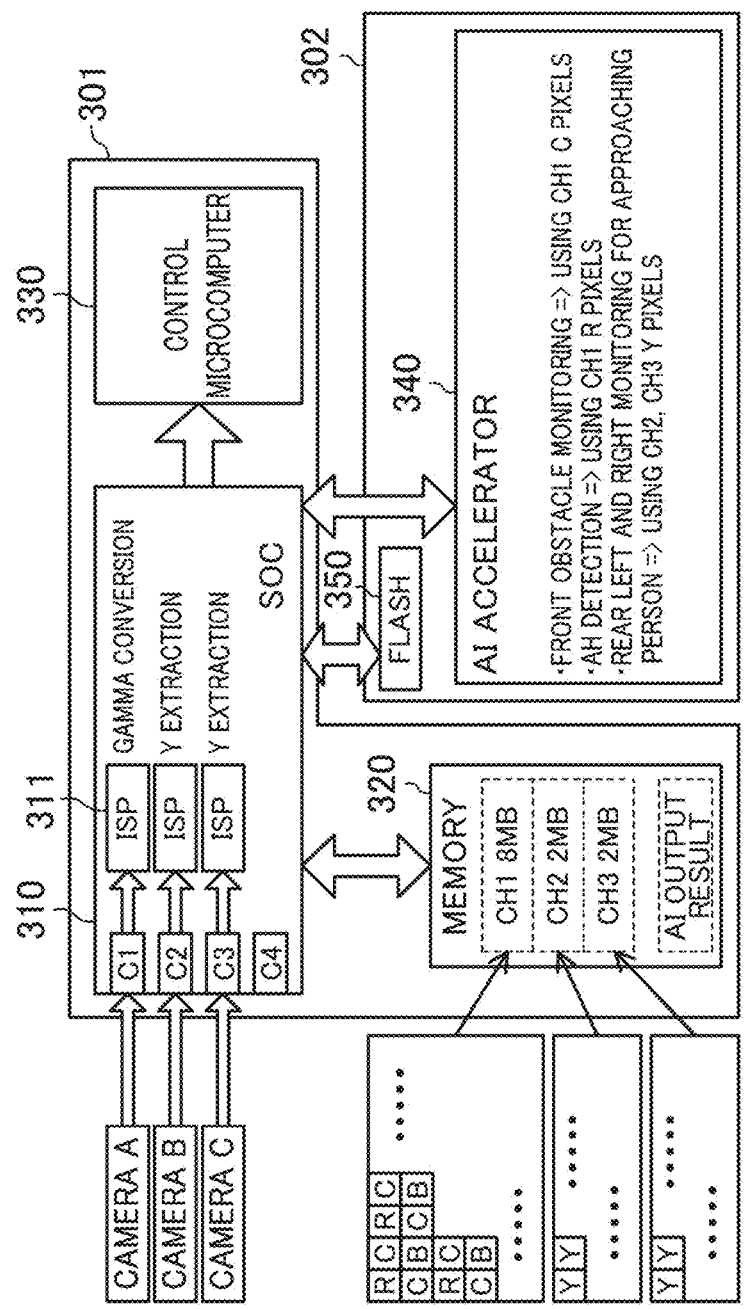
FIG. 5A and FIG. 5B are diagrams illustrating a case where the configuration of FIG. 3 is applied to a high-grade vehicle model.
Figure 5A:
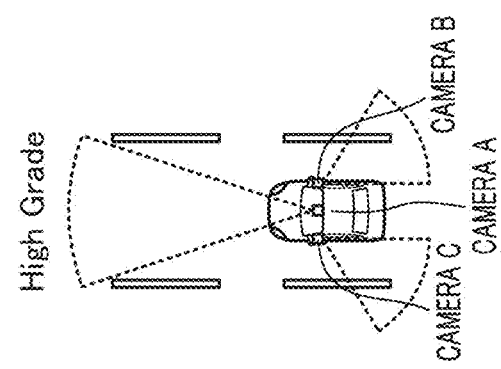

FIG. 5A and FIG. 5B are diagrams illustrating a case where the configuration of FIG. 3 is applied to a high-grade vehicle model. As illustrated in FIG. 5A, in this vehicle model, in addition to the camera A that captures images of front of the automobile, a camera B that captures images of rear right of the automobile and a camera C that captures images of rear left of the automobile are installed. The camera A outputs data of 1 pixel 12 bits in the RCCB format and each of the camera B and the camera C outputs data of 1 pixel 8 bits in a YUV format. Y denotes a luminance signal, U denotes a difference from a blue component, V denotes a difference form a red component, and YUV is data using a characteristic of human eyes that human eyes are sensitive to a change of luminance. In this case, in the flash memory 350, as information of image processing performed on the camera output, processing of converting the data to data of 8 bits through gamma conversion is set for the camera A, and processing of extracting only Y components is set for the cameras B and C. As illustrated in FIG. 5B, the SOC 310 reads camera information from the flash memory 350, sets processing of converting the data to data of 8 bits trough gamma conversion for the camera A, and sets processing of extracting only Y components for the cameras B and C. Then, the image processor 311 executes image processing on the camera outputs that have been input to the input ports C1, C2, and C3 and stores image signals of results of execution in the memory 320 (CH1 data, CH2 data, CH3 data).

In the AI accelerator 340, as applications of this vehicle model, front obstacle monitoring, AH detection, and rear left and right monitoring for approaching person are set. Front obstacle monitoring is executed using C pixels of the CH1 data, AH detection is executed using R pixels of the CH1 data, and rear left and right monitoring for approaching person is executed using Y pixels of the CH1 data and CH2 data. The AI accelerator 340 stores execution results of the applications in the memory 320. Information, that is, for example, whether an obstacle is rapidly approaching and front emergency braking is needed, whether automatic high beam may be performed, whether a lane change is possible without any obstacle approaching the automobile from rear right, or the like, is stored in the memory 320. The execution results of the applications executed by the AI accelerator 340 are used for processing thereafter, that is, for example, route generation executed by the control microcomputer 330.

An address used in storing the execution results of the applications performed by the AI accelerator 340 in the memory 320 may be set to be common for a plurality of vehicle models, not depending on the vehicle model. In this case, as for an application set for a high-grade vehicle model but not set for a low-grade vehicle model, as an address at which an execution result thereof is stored, a fixed value may be stored for the low-grade vehicle model.

FIG. 6 is a flowchart illustrating a flow of processing in the configuration example of FIG. 3. First, when the automobile is started, the SOC 310 reads camera information from the flash memory 350 (S11). The SOC 310 sets processing contents of image processing performed on a camera output and a write destination address of an image signal of a processing result, based on the read camera information (S12).

Thereafter, the SOC 310 takes in the camera output from an input port to execute image processing (S13). Then, the SOC 310 stores the image signal generated as a result of image processing in the memory 320 (S14). The AI accelerator 340 executes an application using the image signal stored in the memory 320 (S15). Then, the AI accelerator 340 stores an execution result of the application in the memory 320 (S16). The SOC 310 reads the execution result of the application executed by the AI accelerator 340 from the memory 320 to output the read execution result to the control microcomputer 330 (S17). The control microcomputer 330 executes processing, that is, for example, route generation or the like, using the execution result of the application executed by the AI accelerator 340 (S18). Thereafter, processing of S13 to S18 is repeatedly executed.

As described above, according to this embodiment, the arithmetic operation device for automobiles includes the fixed section having a common configuration for a plurality of vehicle models and the variable section having a configuration in accordance with a vehicle model of the automobile. For example, the fixed section includes the SOC 310 that performs predetermined image processing on an output of a camera installed in the automobile and the memory 320 that stores a generated image signal, and the variable section includes the AI accelerator 340 that executes an application in accordance with the vehicle model of the automobile using the image signal stored in the memory 320 and transmits an execution result to the fixed section. Thus, the fixed section is common for the plurality of vehicle models, so that development costs and production costs can be reduced. On the other hand, the variable section has the configuration in accordance with the vehicle model and, for example, in performing a specification change or a version upgrade of the AI accelerator 340, it is not necessary to replace the entire arithmetic operation device and only the variable section may be replaced.

Moreover, the fixed section and the variable section are separately provided different sub states, so that influences of heat generation or the like given to each other can be avoided. For example, in the chip configuration of FIG. 3, process speed of the AI accelerator 340 is high and a power consumption or a heat generation amount thereof is remarkably high, as compared to other chips. Therefore, by mounting the AI accelerator 340 on the sub substrate 302 that is a separate substrate from the main substrate 301 on which the SOC 310 and the control microcomputer 330 are mounted, an influence of heat generation by the AI accelerator 340 on the SOC 310 or the like can be avoided.

Furthermore, the main substrate 301 and the sub substrate 302 may be coupled to different power source systems. Thus, influences of heat generation, power consumption, or the like of the main substrate 301 and the sub substrate 302 on each other can be further avoided.

Moreover, the control microcomputer 330 generates a route of the automobile, based on an execution result of an application executed by the AI accelerator 340. Herein, the control microcomputer 330 is preferably configured to execute route generation by a rule base function. Thus, even in a case of a failure of the AI accelerator 340, route generation can be executed by the rule base function, and therefore, the arithmetic operation device for automobiles can hold basic functions, such as route generation or the like.

The chip configuration of FIG. 3 is merely an example and the present disclosure is not limited thereto. For example, the flash memory 350 on the sub substrate 302 may be a memory having some other configuration. The memory may be provided with the AI accelerator 340 on the same chip. However, because the latest production process is applied to the AI accelerator 340, in terms of production process, the AI accelerator 340 and the memory are preferably provided separately on different chips. As another alternative, the AI accelerator 340 and the memory may be mounted separately on different substrates.

Moreover, in the arithmetic operation device for automobiles, components provided in the fixed section and the variable section are not limited those described herein. For example, an AI processing unit that estimates a state of the driver from an image of the driver may be provided in the fixed portion.

DESCRIPTION OF REFERENCE CHARACTERS

1 Information processing unit (arithmetic operation device for automobiles)
1A, 1B, 1C Arithmetic operation device for automobiles
2 Fixed section (first arithmetic operation section)
3A, 3B, 3C Variable section (second arithmetic operation section)
301 Main substrate (first arithmetic operation section)
302 Sub substrate (second arithmetic operation section)
310 SOC
311 Image processor
320 Memory
330 Control microcomputer
340 AI accelerator (processor)
350 Flash memory (second memory)

The invention claimed is:

1. An arithmetic operation device for automobiles mounted on an automobile and configured to execute an arithmetic operation for controlling traveling of the automobile, the arithmetic operation device comprising:

a first arithmetic operation section having a common configuration for a plurality of vehicle models including a vehicle model of the automobile; and
a second arithmetic operation section configured to transmit and receive data to and from the first arithmetic operation section and having a configuration in accordance with the vehicle model of the automobile,
wherein
the first arithmetic operation section incudes
an image processor configured to perform predetermined image processing on an output of a camera installed in the automobile, and
a memory configured to store an image signal generated by the image processor, and
the second arithmetic operation section includes
a processor configured to execute an application in accordance with the vehicle model of the automobile using the image signal stored in the memory and to transmit an execution result to the first arithmetic operation section.

2. The arithmetic operation device for automobiles of claim 1, wherein
the second arithmetic operation section further includes a second memory configured to store camera information in accordance with the vehicle model of the automobile, and
the first arithmetic operation section reads camera information from the second memory and sets processing contents of image processing in the image processor in accordance with the camera information.

3. The arithmetic operation device for automobiles of claim 2, wherein
the first processing section is mounted on a first substrate, and
the second processing section is mounted on a second substrate that is different from the first substrate.

4. The arithmetic operation device for automobiles of claim 2, wherein
the processor executes an arithmetic operation using a learnt model generated by deep learning.

5. The arithmetic operation device for automobiles of claim 1, wherein
the first processing section is mounted on a first substrate, and
the second processing section is mounted on a second substrate that is different from the first substrate.

6. The arithmetic operation device for automobiles of claim 5, wherein
the first substrate and the second substrate are coupled to different power source systems.

7. The arithmetic operation device for automobiles of claim 6, wherein
the processor executes an arithmetic operation using a learnt model generated by deep learning.

8. The arithmetic operation device for automobiles of claim 5, wherein
the processor executes an arithmetic operation using a learnt model generated by deep learning.

9. The arithmetic operation device for automobiles of claim 1, wherein
the processor executes an arithmetic operation using a learnt model generated by deep learning.

10. The arithmetic operation device for automobiles of claim 9, wherein
the first arithmetic operation section is configured to generate a route of the automobile, based on an execution result of an application executed by the processor, and to execute route generation by a rule base function when the processor has failed.

* * * * *